(12) United States Patent
Shand

(10) Patent No.: US 9,283,934 B2
(45) Date of Patent: Mar. 15, 2016

(54) ADJUSTABLE BRAKE PEDAL SYSTEM

(71) Applicant: FORD GLOBAL TECHNOLOGIES, LLC, Dearborn, MI (US)

(72) Inventor: Mark Allen Shand, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/293,046

(22) Filed: Jun. 2, 2014

(65) Prior Publication Data

US 2015/0344005 A1    Dec. 3, 2015

(51) Int. Cl.
| G05G 1/30 | (2008.04) |
| B60T 7/04 | (2006.01) |
| G05G 1/40 | (2008.04) |
| G05G 5/03 | (2008.04) |
| B60T 7/06 | (2006.01) |

(52) U.S. Cl.
CPC . B60T 7/042 (2013.01); B60T 7/06 (2013.01); G05G 1/40 (2013.01); G05G 5/03 (2013.01); *Y10T 74/2054* (2015.01)

(58) Field of Classification Search
CPC ......... G05G 1/38; G05G 1/405; G05G 1/445; G05G 1/46; Y10T 74/20528
USPC ................ 74/473.16, 478, 512–514; 267/216
See application file for complete search history.

(56) References Cited

U.S. PATENT DOCUMENTS

| 5,832,784 | A | | 11/1998 | McCallips et al. |
| 5,996,439 | A | * | 12/1999 | Elton et al. ...................... 74/512 |
| 6,360,629 | B2 | | 3/2002 | Schambre et al. |
| 6,367,348 | B1 | * | 4/2002 | Toelke et al. ................... 74/512 |
| 6,782,775 | B2 | * | 8/2004 | Hayashihara ................... 74/512 |

(Continued)

FOREIGN PATENT DOCUMENTS

| CN | 102822020 A | 12/2012 |
| DE | 102005036922 A1 | 3/2007 |
| DE | 102009027480 A1 | 1/2011 |

(Continued)

*Primary Examiner* — Adam D Rogers
(74) *Attorney, Agent, or Firm* — Raymond L. Coppiellie; Brooks Kushman P.C.

(57) ABSTRACT

A brake pedal assembly for a brake-by-wire system or vehicle having a traction battery. The brake pedal assembly has both a pedal feel simulator and an adjustable brake pedal. The pedal feel simulator has a fixed cam surface and a moving cam follower that provides increased resistance that simulates that of an actual brake system as the brake pedal arm is depressed. The brake pedal assembly has a pivotal adjustment subassembly that the cam follower may extend from. The adjustment subassembly may also have a brake pedal arm adjustably connected to and extending therefrom. The adjustment subassembly provides a consistent path of rotation per brake pedal depress allowing for the cam follower to have substantially consistent movement across the fixed cam surface, providing substantially consistent pedal feel feedback, regardless of where the brake pedal has been adjusted to within a vehicle foot-well.

14 Claims, 2 Drawing Sheets

(56) References Cited

U.S. PATENT DOCUMENTS

| | | |
|---|---|---|
| 6,782,776 B2 * | 8/2004 | Oberheide et al. .............. 74/512 |
| 7,082,853 B2 | 8/2006 | Fujiwara |
| 7,111,524 B2 * | 9/2006 | Kiczek et al. ................... 74/512 |
| 7,424,836 B2 * | 9/2008 | Takai .............................. 74/512 |
| 7,568,406 B2 * | 8/2009 | Booher et al. ................... 74/512 |
| 8,196,695 B2 * | 6/2012 | Kim et al. ...................... 180/274 |
| 8,474,348 B2 | 7/2013 | Soltys et al. |
| 8,806,976 B2 * | 8/2014 | Soltys et al. .................... 74/512 |
| 2011/0185843 A1 | 8/2011 | Soltys et al. |
| 2015/0107402 A1 * | 4/2015 | Leem .............................. 74/512 |

FOREIGN PATENT DOCUMENTS

| | | |
|---|---|---|
| EP | 1552995 A2 | 7/2005 |
| EP | 2426019 A1 | 3/2012 |
| WO | 2012058330 A2 | 5/2012 |

* cited by examiner

ADJUSTABLE BRAKE PEDAL SYSTEM

TECHNICAL FIELD

The present disclosure relates to brake pedal assemblies, specifically to assemblies having adjustable brake pedals in brake-by-wire systems.

BACKGROUND

Traditional brake systems in a motor vehicle typically include hydraulically actuated wheel brakes, a master cylinder in fluid communication with the wheel brakes, and a brake pedal mechanically connected to the master cylinder via a brake booster. As an operator depresses the brake pedal a booster rod pushes on the booster/master cylinder to move a piston within the master cylinder which pushes hydraulic fluid pressure the wheel brakes, such as calipers or drum brakes, which in turn apply frictional force to rotors or drums, respectively. The activation of the brake booster/master cylinder is resisted or opposed by a force attributable to fluid pressure in the hydraulic fluid channels and the brake pads or linings pressing against the rotors or drums. This resistive or opposing force increases relative to the movement of the brake pedal assembly as additional braking force is applied to the wheel brakes. In other words, the further the brake pedal is pushed the harder it gets to push it. Motor vehicle operators perceive this relationship between movement of the brake pedal assembly and increasing resistive force as "pedal feel" of the brake system. Drivers expect a form of pedal feel from all motor vehicle brake systems.

Motor vehicle brake systems have been designed in which fluid pressure to apply a wheel brake may be created independently of a direct mechanical connection between the brake pedal and the brake booster/master cylinder. Systems such as this are often referred to as a "brake-by-wire" system. Since the direct mechanical connection may be separated during some or all modes, the push back aspect of the pedal feel may not be felt by the operator. Vehicles having a traction battery and regenerative braking capability often require a brake-by-wire system. Since drivers expect a form of pedal feel from all motor vehicle brake, it may be advantageous to provide a simulated pedal feel of a traditional brake system in a brake-by-wire brake system.

As well, in traditional brake systems (non brake-by-wire systems), adjustable pedals have been provided to accommodate drivers of various heights. Thus, the adjustment apparatus allows the pedal/pedal assembly to be moved closer to, or further away from, a driver for improved access. The adjustability of the brake pedal may change the pedal feel, and thus it may be advantageous to provide compensation in a traditional brake system to maintain a substantially consistent pedal feel regardless of adjusted position. In addition, it may be advantageous to provide an adjustable brake pedal for a brake-by-wire system while also providing a substantially consistent pedal feel at all adjusted positions.

SUMMARY

One aspect of this disclosure is directed to a brake-by-wire brake pedal. The assembly has a mounting bracket configured to connect to a vehicle and define a brake pedal pivot axis. The assembly has an adjustment subassembly pivotally connected to the mounting bracket about the pivot axis. The assembly has a pedal feel simulator configured to provide pedal feel feedback during the pivoting of the adjustment subassembly relative the mounting bracket. The assembly also has a brake pedal arm adjustably connected to the adjustment subassembly.

In this assembly, the brake pedal arm has may have a proximal end with a brake pedal pad mounted thereon, a distal end extending to and pivotal about the pivot axis, and a middle portion disposed between the proximal and distal ends adjustably connected to the adjustment subassembly. The adjustment subassembly may also have an adjuster mechanism connected to the brake pedal arm configured to move the brake pedal relative to the adjustment subassembly. In this case, the adjustment subassembly may define a slot, the brake pedal arm may have a mini-axle extending therefrom supporting a stability wheel, the stability wheel may be disposed in the slot, and actuation of the adjuster mechanism may cause the stability wheel to translate within the slot.

The pedal feel simulator may have a pedal feel arm fixedly connected adjacent to the adjustment subassembly. The pedal feel arm may extend from the adjustment subassembly. A simulator bracket may extend from the mounting bracket having a pedal feel cam surface. A cam follower may extend from the pedal feel arm and contact the pedal feel cam surface to simulate a pedal feel when the pedal feel arm is moved.

The assembly may have a brake booster rod connected to the pedal feel arm. The pedal feel arm may extend to and is pivotal about the pivot axis. As well, the pedal feel simulator may also have a spring in contact with the mounting bracket configured to apply a preload force to the brake pedal arm.

Another aspect of this disclosure is directed to an adjustable brake pedal assembly. In this assembly, an adjustment subassembly is pivotally connectable to a vehicle. A brake pedal arm is translatably coupled to the adjustment subassembly. The brake pedal arm also extends downwardly from the adjustment subassembly. Also in this assembly, a pedal feel simulator is partially connectable to the vehicle proximate the adjustment subassembly. The pedal feel simulator cooperates with the adjustment subassembly to provide a substantially consistent pedal feel simulation on a movement of the adjustment subassembly regardless of brake pedal arm adjustment.

The assembly may also have a mounting bracket connectable to the vehicle. The mounting bracket may define a pivot axis, in which the adjustment subassembly may be pivotally connected to the mounted bracket about the pivot axis. The adjustment subassembly may have an adjuster mechanism connected to the brake pedal arm configured to move the brake pedal arm relative to the adjustment subassembly. The brake pedal arm may have a proximal end with a brake pedal pad mounted thereon. The brake pedal arm may have a distal end extending to and pivotal about the pivot axis. The brake pedal arm may also have a middle portion disposed between the proximal and distal ends adjustably connected to the adjustment subassembly.

The pedal feel simulator may have a simulator bracket having a cam surface connected to the mounting bracket. The pedal feel simulator may have a pedal feel arm connected to and extending from the adjustment subassembly. The pedal feel simulator may have a cam follower connected to and extending from the pedal feel arm. The cam follower may have a roller on one end in contact with the cam to provide pedal feel feedback as the brake pedal arm is depressed. A brake booster rod may also be connected to the pedal feel arm.

A further aspect of this disclosure is directed to an adjustable brake pedal assembly for a vehicle with a traction battery. In this assembly, a mounting bracket is configured to be connected to the vehicle in a driver foot-well. The mounting bracket defines a pivot axis. A brake pedal arm has a distal end pivotally connected to the mounting bracket about the pivot axis. The brake pedal arm also has a proximal end extending from the distal end having a brake pedal pad disposed thereon.

The assembly has an adjustment subassembly pivotally connected to the mounting bracket about the pivot axis. The adjustment subassembly having an adjuster mechanism connected to the brake pedal arm configured to move the brake pedal pad relative to the adjuster mechanism. The same assembly also has a pedal feel simulator with a cam surface connected to and extending from the mounting bracket. The pedal feel simulator also has a cam follower connected to the adjustment subassembly such that pivoting of the adjustment subassembly about the pivot axis produces a resistance during braking The adjustment subassembly may have an inboard panel and an outboard panel such that a portion of the brake pedal arm is disposed therebetween. The adjuster mechanism may have a motor disposed on rearward edges of the inboard and outboard panels. The motor may be connected to the brake pedal arm between the inboard and outboard panels. Actuation of the motor in a first direction may translate the brake pedal pad substantially rearward in the foot-well relative to the adjustment subassembly, and actuation of the motor in a second direction may translate the brake pedal pad substantially forward in the foot-well. The inboard panel may define an elongated slot. The brake pedal arm may have a stability member extending therefrom and disposed in the slot.

The assembly may include a pedal feel arm pivotally connected to the mounting bracket about the pivot axis. The pedal feel arm may be connected to the outboard panel of the adjustment subassembly. The cam follower may be connected to and extend from the pedal arm. The connection of the cam follower to the pedal feel arm, and the connection of the pedal feel arm to the adjustment subassembly is how the cam follower may be connected to the adjustment subassembly. The assembly may also have a resilient member in contact with the mounting bracket and the adjustment subassembly configured to provide a preload force biasing the brake pad substantially rearward from the mounting bracket.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
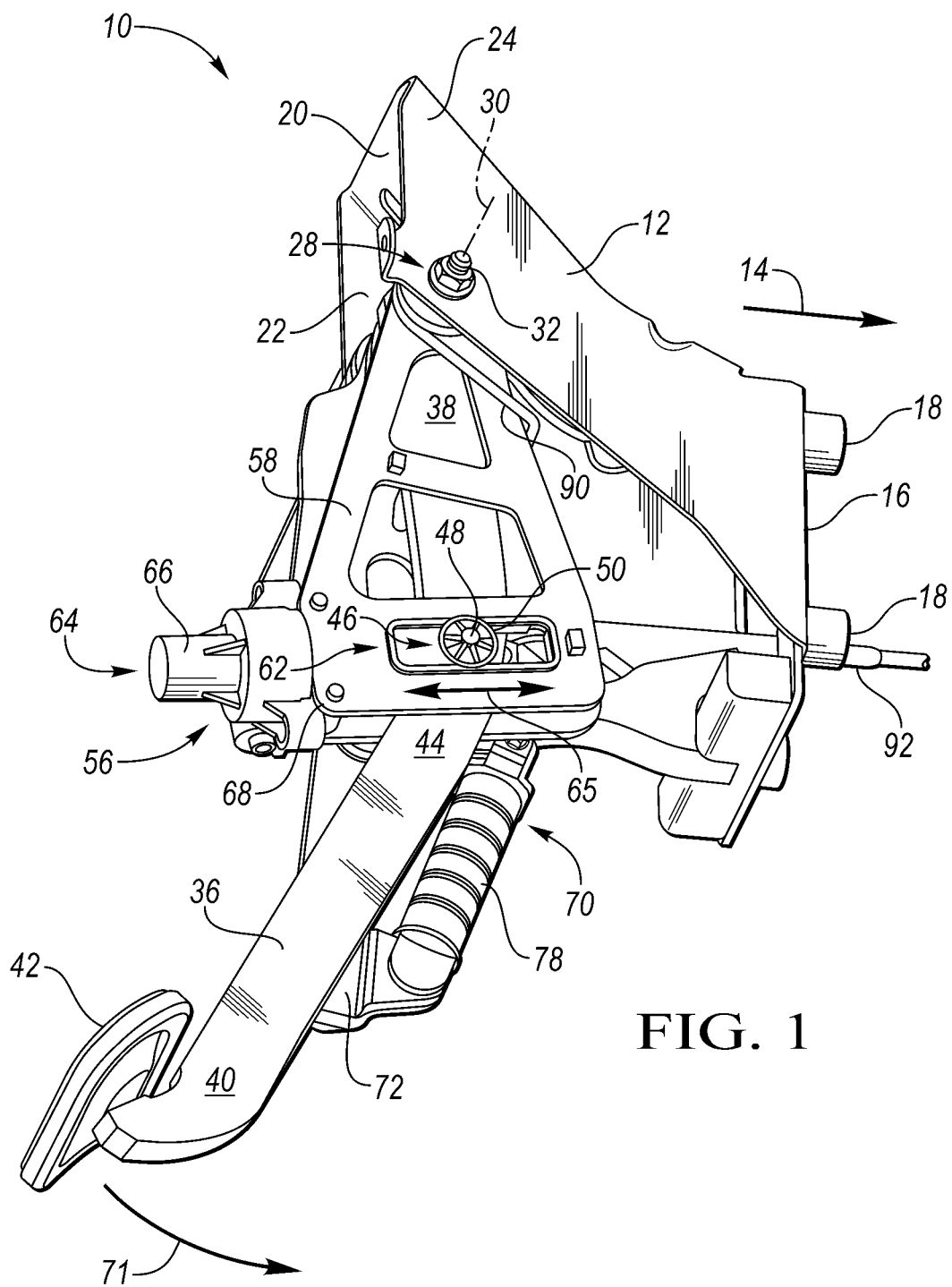
FIG. 1 is a perspective view of a right side of an adjustable brake pedal assembly.
Figure 2:
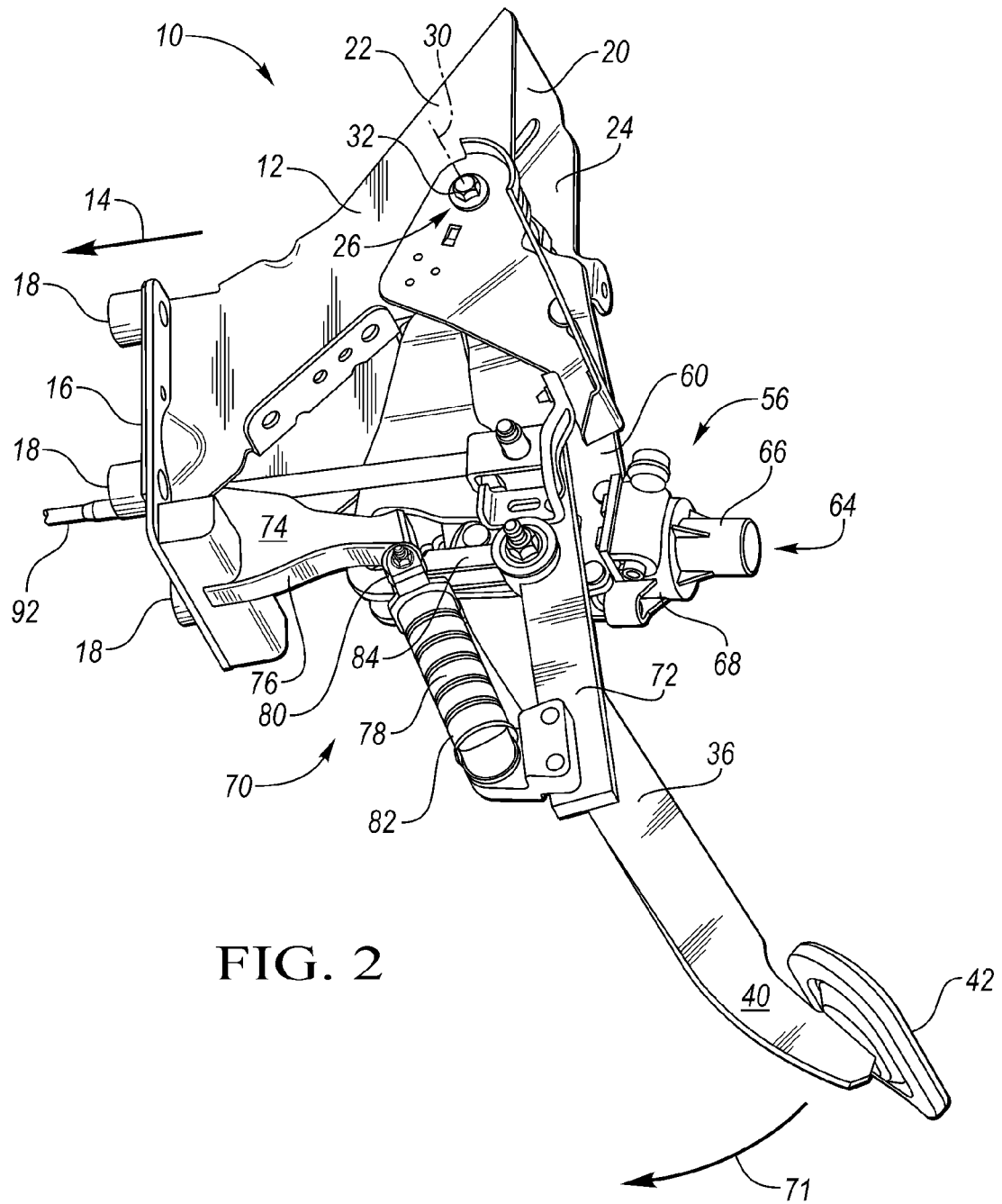
FIG. 2 is a perspective view of a left side of an adjustable brake pedal assembly.

FIGS. 1 and 2 show right hand and left hand views, respectively, of a brake pedal assembly 10. The brake pedal assembly 10 may be used with a vehicle with a traction battery (not shown), such as a battery electric vehicle (BEV) or a hybrid electric vehicle (HEV), or any vehicle with a brake-by-wire system (also not shown). The brake pedal assembly 10 has a mounting bracket 12 connectable to the vehicle. The mounting bracket 12 may be configured to be connected to the vehicle in a driver foot-well of a passenger compartment of the vehicle, as indicated by arrows 14. Although shown with a mounting bracket 12 as part of the overall assembly, it is also envisioned that individual components of the assembly could be connected into a driver foot-well without the use of the mounting bracket 12.

The mounting bracket 12 may have a forward wall 16 with a number of mounting grommets 18 extending from the forward wall 16 substantially longitudinally forward. The mounting grommets 18 may fit within receiving holes/slots within the vehicle foot-well 14. The mounting bracket 12 may have an upper wall 20 extending substantially longitudinally rearwardly and upwardly from the forward wall 16. Two substantially parallel side walls 22, 24 may extend substantially downwardly from the upper wall 20. Fasteners (not shown) may be used to couple the mounting bracket 12 to a panel (not shown) in the foot-well 14. The fasteners may connect the forward wall 16 or the upper wall 20, or both, to a panel in the vehicle foot-well 14. The side walls 22, 24 each define a pivot axis hole 26, 28, and the two holes 26, 28 cooperate to define a brake pedal pivot axis 30. A pin 32 may be inserted through the two holes 26, 28.

The brake pedal assembly 10 has a brake pedal arm 36. The brake pedal arm 36 may having a distal end 38 pivotally connected to the mounting bracket 12 about the pivot axis 30 for additional support, although it is not required. The brake pedal arm 36 may have a proximal end 40 with a brake pedal pad 42 mounted thereon. The brake pedal arm 36 may have a middle portion 44 disposed between the proximal and distal ends 40, 38. The brake pedal arm 36 may have a stability member 46 transversely extending from the middle portion 44. The stability member 46 may be a mini-axle 48 extending from the middle portion 44 with a stability wheel 50 disposed thereon.

The brake pedal assembly 10 has an adjustment subassembly 56 pivotally connected to the mounting bracket 12 about the pivot axis 30. The adjustment subassembly 56 may have an inboard panel 58 and an outboard panel 60. The inboard and outboard panels 58, 60 may be substantially parallel to each other. A portion of the brake pedal arm 36 may be disposed between the inboard and outboard panels 58, 60. The inboard panel 58 may define an elongated slot 62 in which the stability member 46 may be disposed within.

An adjuster mechanism 64 may be connected to the middle portion 44 of the brake pedal arm 36. The adjuster mechanism 64 may be connected to the brake pedal arm 36 between the inboard and outboard panels 58, 60. The adjuster mechanism 64 is configured to move the brake pedal arm 36 relative the adjustment subassembly 56. Actuation of the adjuster mechanism 64 causes the stability member 46 to translate within the slot 62, as indicated by arrow 65. Actuation of the adjuster mechanism 64 causes the brake pedal pad 42 to translate for or aft within the foot-well 14. Thus the middle portion 44 of the brake pedal arm 36 may be adjustably connected to the adjustment subassembly.

A motor 66 may be disposed on rearward edges 68 of the inboard and outboard panels 58, 60 and used to actuate the adjuster mechanism 64. A switch (not shown) may be operated by a driver to energize the motor 66 two rotate in two different directions. Actuation of the motor 66 in a first direction may move the brake pedal pad 42 substantially longitudinally rearward in the foot-well 14. Actuation of the motor 66 in a second direction may move the brake pedal pad 42 substantially longitudinally forward in the foot-well 14. The adjustment subassembly 56 may remain stationary when the brake pedal pad 42 is adjusted, thus the motor 66 moves the brake pedal pad 42 and at least a portion of the brake pedal arm 36 relative to the adjustment subassembly 56. Thus the brake pedal arm 36 is adjustably connected to the adjustment subassembly 56. As well, the brake pedal arm 36, or at least a portion thereof, may extend downwardly from the adjustment subassembly 56.

As mentioned above, the brake pedal arm 36 does not have to extend and connect to the pivot axis 30, as shown in the figures, rather the brake pedal arm 36 need only connect to the adjustment subassembly 56 and extend therefrom.

A pedal feel simulator 70 may be used in cooperation with the adjustment subassembly 56 to provide pedal feel simulation on a movement of the adjustment subassembly 56. As mentioned above, pedal feel is a progressive resistive force that increases relative to the movement of the brake pedal. In other words, the pedal feel simulator 70 makes it harder to push the brake pedal arm 36 the further the brake pedal arm 36 is pushed. The pedal feel simulator 70 provides a substantially consistent pedal feel curve (the increase in resistive force to brake pedal movement) regardless of brake pedal arm adjustment.

Depressing of the brake pedal pad 42 by a driver's foot, as shown by arrow 71, moves the brake pedal arm 36, which is connected to the adjustment subassembly 56, causing the adjustment subassembly 56 to pivot about the pivot axis 30. Pivoting of the adjustment subassembly 56 about the pivot axis 30 produces the pedal feel feedback, as simulated by the pedal feel simulator 70, to the brake pedal pad 42 and back into the driver's foot.

The pedal feel simulator 70 may have a pedal feel arm 72 fixedly connected to the adjustment subassembly 56. The pedal feel arm 72 may connect to the outboard panel 60. The pedal feel arm 72 may also be pivotally connected to the mounting bracket 12 about the pivot axis 30. The pedal feel arm 72 is configured to be in fixed rotation with the adjustment subassembly 56. In the case of an assembly without a mounting bracket 12, the pedal feel simulator 70 may be connectable between the adjustment subassembly 12 and a vehicle panel (not shown) proximate the adjustment subassembly 56.

The pedal feel simulator 70 may also have a simulator bracket 74. The simulator bracket 74 may be connected to and extend from the mounting bracket 12. The simulator bracket 74 may define a pedal feel cam surface 76. The pedal feel simulator 70 also has a cam follower 78 in contact with the pedal feel cam surface 76. The cam follower 78 is configured to simulate a pedal feel when the cam follower 78 moves across the pedal feel cam surface 76. The cam follower is moved across the pedal feel cam surface when the brake pedal arm 36 is depressed; the brake pedal arm 36 moves the adjustment subassembly 56 to which it is attached, which in turn moves the pedal feel arm 72 to which it is attached, which in turn slides the cam follower 78 across the cam surface 76. The pedal feel arm 72 and adjustment subassembly 56 always have the same pivotal movement relative to the mounting bracket 12 regardless to where the brake pedal pad 42 has been adjusted to.

The cam follower 78 may be connected to and extend from the pedal feel arm 72. The cam follower 78 may have a roller 80 on one end, with the other end being pivotally connected to the pedal feel arm 72. The roller 80 may be in contact with and follow the pedal feel cam surface 76. The cam follower 78 may include a compression spring 82. The cam follower 78 may also have a locating link 84 pivotally connected at the roller 80 and also pivotally connected to the pedal feel arm 72.

In an alternate embodiment, the cam follower 78 may be connected to and extend from the adjustment subassembly 56.

The brake pedal assembly 10 may have a resilient member 90 in contact with the mounting bracket 12 and configured to apply a preload force to the brake pedal arm 36. The resilient member 90 may be a torsion spring 90 with a portion of the torsion spring 90 coiled around the pivot axis 30. The resilient member 90 is in contact with the mounting bracket 12 and the adjustment subassembly 56 and configured to provide a preload force biasing the brake pad 42 substantially longitudinally rearward from the mounting bracket 12.

The brake pedal assembly 10 may also have a booster rod 92. The booster rod 92 may be connected to the pedal feel arm 72. In the alternative, the booster rod 92 may be connected to the adjustment subassembly 56. It is not as desirable to connect the booster rod 92 to the brake pedal arm 36, as the adjustment of the brake pedal arm 36 may change the connection length of the booster rod 92, and since the pedal feel arm 72 and adjustment subassembly 56 maintain a fixed rotational path around the pivot axis 30, having the booster rod 92 connected to either of these components maintains a consistent reach toward the booster (not shown) when the brake pedal is depressed and the brake system actuates.

Translation of the brake pedal arm 36 relative to the adjustment subassembly 56, as shown by arrow 65, does not pivot the adjustment subassembly 56 about the pivot axis 30 (so long as no force is added to the brake pedal pad 42). This allows for the brake pedal pad 71 to be adjusted depending on a driver's preference. Translation of the brake pedal arm 36 relative to the adjustment subassembly 56, as shown by arrow 65, does not cause movement of the pedal feel simulator 70 or the booster rod 92. Once the brake pedal pad 42 is adjusted into a position, the adjustment assembly 56 maintains the relative adjustment, such that when the brake pedal pad 42 is depressed, as indicated by arrow 71, the adjustment subassembly 56 is pivoted about the pivot axis 30. Pivoting of the adjustment subassembly 56 about the pivot axis 30 moves engages the pedal force simulator 70 and moves the booster rod 92.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A brake pedal assembly comprising:
   a mounting bracket defining a pivot axis;
   an adjustment subassembly pivotally connected to the mounting bracket about the pivot axis and defining a slot;
   a pedal feel simulator having a cam follower moving along a cam surface supported by the mounting bracket during pivoting of the adjustment subassembly; and
   a brake pedal arm rotatable about the pivot axis and having a wheel translating within the slot during pedal adjustment.

2. The assembly of claim 1 wherein the brake pedal arm has a proximal end with a brake pedal pad mounted thereon, a distal end extending to and rotatable about the pivot axis, and a middle portion disposed between the proximal and distal ends adjustably connected to the adjustment subassembly by the wheel and the slot.

3. The assembly of claim 1 wherein the adjustment subassembly has a motor connected to the brake pedal arm configured to move the brake pedal relative to the adjustment subassembly.

4. The assembly of claim 1, the brake pedal arm having an axle extending therefrom supporting the wheel.

5. The assembly of claim 1 wherein the pedal feel simulator has a pedal arm connected to the adjustment subassembly and extending therefrom supporting the cam follower, and the cam surface is disposed on a simulator bracket extending from the mounting bracket.

6. The assembly of claim 5 further comprising a brake booster rod connected to the pedal arm.

7. The assembly of claim 5 wherein the pedal arm extends to and is pivotal about the pivot axis.

8. The assembly of claim 5 wherein the pedal feel simulator has a spring in contact with the mounting bracket configured to apply a preload force to the brake pedal arm.

9. An adjustable brake pedal assembly for a vehicle with a traction battery, comprising:
 a mounting bracket configured to be connected to the vehicle in a driver foot-well, the mounting bracket defining a pivot axis;
 a brake pedal arm having a distal end pivotally connected to the mounting bracket about the pivot axis and a proximal end extending therefrom having a brake pedal pad;
 a stability member having an axle and a stability wheel extending from the brake pedal arm;
 an adjustment subassembly pivotally connected to the mounting bracket about the pivot axis having an adjuster mechanism connected to the brake pedal arm via the stability member, configured to move the brake pedal pad relative to the adjuster mechanism; and
 a pedal feel simulator having a cam surface connected to and extending from the mounting bracket and a cam follower connected to the adjustment subassembly such that pivoting of the adjustment subassembly about the pivot axis produces a resistance during braking.

10. The assembly of claim 9 wherein the adjustment subassembly has an inboard panel and an outboard panel, and a portion of the brake pedal arm is disposed between the inboard and outboard panels.

11. The assembly of claim 10 wherein the adjuster mechanism has a motor disposed on rearward edges of the inboard and outboard panels and is connected to the brake pedal arm between the inboard and outboard panels, and wherein actuation of the motor in a first direction translates the brake pedal pad substantially rearward in the foot-well relative to the adjustment subassembly, and actuation of the motor in a second direction translates the brake pedal pad substantially forward in the foot-well.

12. The assembly of claim 11 wherein the inboard panel defines an elongated slot configured to cooperate with the stability wheel of the stability member.

13. The assembly of claim 10 further comprising a pedal arm pivotally connected to the mounting bracket about the pivot axis and connected to the outboard panel of the adjustment subassembly, wherein the cam follower is connected to and extends from the pedal arm to connect it to the adjustment subassembly.

14. The assembly of claim 10 further comprising a resilient member in contact with the mounting bracket and the adjustment subassembly configured to provide a preload force biasing the brake pad substantially rearward from the mounting bracket.

\* \* \* \* \*